United States Patent
Nakamura

(10) Patent No.: US 9,975,539 B2
(45) Date of Patent: May 22, 2018

(54) TRAVEL CONTROL DEVICE AND TRAVEL CONTROL METHOD

(71) Applicant: Nissan Motor Co., Ltd., Yokohama-Shi, Kanagawa (JP)

(72) Inventor: Masahide Nakamura, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/501,074

(22) PCT Filed: Aug. 11, 2014

(86) PCT No.: PCT/JP2014/071182
§ 371 (c)(1),
(2) Date: Feb. 1, 2017

(87) PCT Pub. No.: WO2016/024317
PCT Pub. Date: Feb. 18, 2016

(65) Prior Publication Data
US 2017/0217422 A1    Aug. 3, 2017

(51) Int. Cl.
*B60W 10/20* (2006.01)
*B60W 10/18* (2012.01)
*G08G 1/16* (2006.01)

(52) U.S. Cl.
CPC ............ *B60W 10/20* (2013.01); *B60W 10/18* (2013.01); *G08G 1/165* (2013.01); *G08G 1/166* (2013.01)

(58) Field of Classification Search
CPC ...... B60W 10/20; B60W 30/09; B60W 10/18; B60W 10/184; B60W 2050/0033;
(Continued)

(56) References Cited

U.S. PATENT DOCUMENTS

2015/0120138 A1* 4/2015 Zeng ................. B62D 15/0265
  701/41
2015/0224987 A1   8/2015 Tachibana

FOREIGN PATENT DOCUMENTS

JP   2005324782 A   11/2005
JP   2009298355 A   12/2009
(Continued)

OTHER PUBLICATIONS

JP2013190931_machine translation.*

*Primary Examiner* — Jelani A Smith
(74) *Attorney, Agent, or Firm* — Young Basile Hanlon & MacFarlane, P.C.

(57) ABSTRACT

A travel control device comprises: an object information acquisition unit that acquires object information including the position of an avoidance object around a subject vehicle; a planning unit that plans a target route passing the avoidance object on the basis of the position of the subject vehicle and the position of the avoidance object; a control unit that outputs command information, and a second setting unit that calculates a distance between the subject vehicle and the avoidance object along the vehicle width direction when driving the subject vehicle on the target route and uses the distance as the basis to set a tolerable vehicle width distance range. When an actual distance from the subject vehicle to the position of the avoidance object along the vehicle width direction is within the tolerable vehicle width distance range, the control unit drives the subject vehicle on the basis of the set target route.

10 Claims, 11 Drawing Sheets

(58) Field of Classification Search
CPC ....... B60W 2520/10; B60W 2710/182; B60W 2710/207; B60W 30/095; B60W 2050/143; B60W 2520/105; B60W 2550/148; B60W 2550/302
See application file for complete search history.

(56) References Cited

FOREIGN PATENT DOCUMENTS

| | | | |
|---|---|---|---|
| JP | 2010202147 A | | 9/2010 |
| JP | 2013091401 A | | 5/2013 |
| JP | 2013190931 A | * | 9/2013 |
| JP | 2014080046 A | | 5/2014 |

* cited by examiner

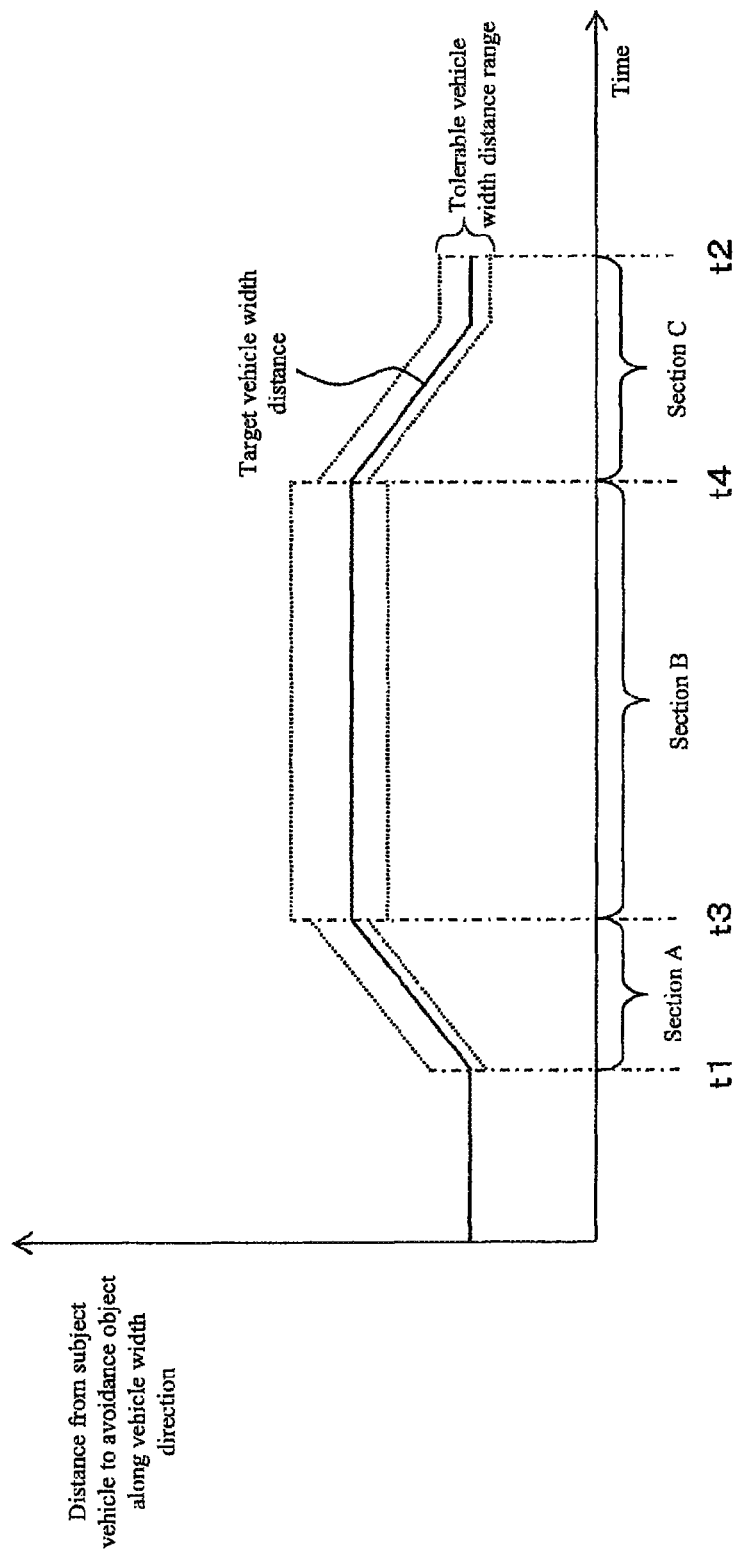

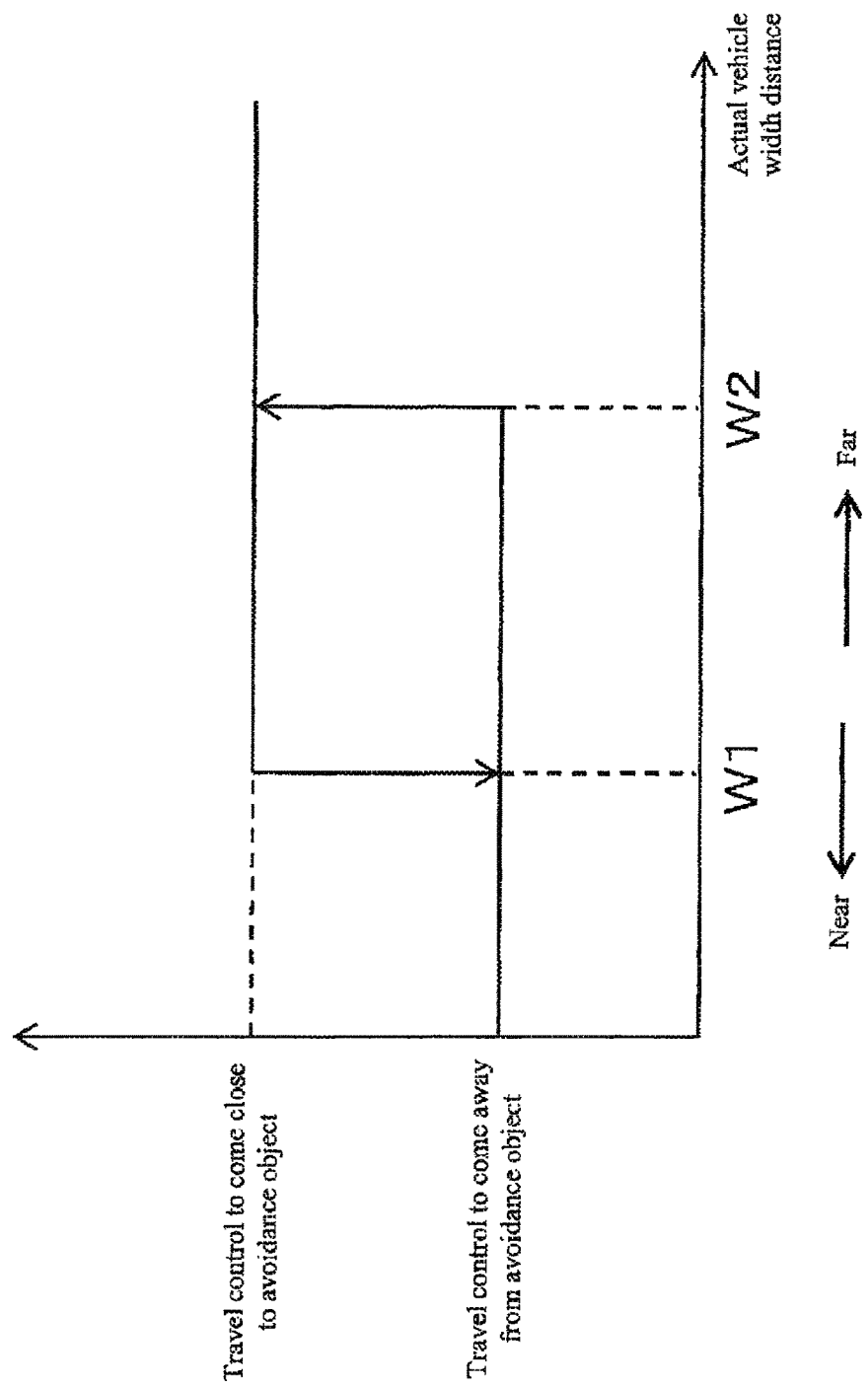

TRAVEL CONTROL DEVICE AND TRAVEL CONTROL METHOD

TECHNICAL FIELD

The present invention relates to a travel control device and travel control method that control travel of a vehicle.

BACKGROUND

In a travel control device that controls travel of a vehicle, a technique has conventionally been known in which, when an approaching vehicle is detected around the subject vehicle, travel of the subject vehicle is controlled so that the distance between the approaching vehicle and the subject vehicle along the vehicle width direction is maintained at a constant distance or more (See JP2013-91401A).

In the above conventional technique, however, when the approaching vehicle sways from side to side, the subject vehicle also sways from side to side due to the sway of the approaching vehicle to give an uncomfortable feeling to the passengers because travel of the subject vehicle is controlled so that the distance between the approaching vehicle and the subject vehicle along the vehicle width direction is maintained at a constant distance or more.

SUMMARY

A problem to be solved by the present invention is to provide a travel control device that can mitigate an uncomfortable feeling given to passengers when controlling travel of a subject vehicle.

The present invention solves the above problem as follows. When a subject vehicle travels on a target route, the distance between the subject vehicle and an avoidance object along the vehicle width direction is calculated as a target vehicle width distance. The target vehicle width distance is used as the basis to set a tolerable vehicle width distance range. When an actual distance between the subject vehicle and the avoidance object along the vehicle width direction is within the tolerable vehicle width distance range, the subject vehicle is driven on the target route which is preliminarily set.

According to the present invention, even if another vehicle as the avoidance object sways from side to side, the subject vehicle can travel on the preliminarily planned target route when the actual distance between the subject vehicle and the avoidance object along the vehicle width direction is within the tolerable vehicle width distance range. Therefore, the sway of the subject vehicle due to the sway of the avoidance object can be effectively prevented.

DETAILED DESCRIPTION OF THE DRAWINGS

Figure 5A:
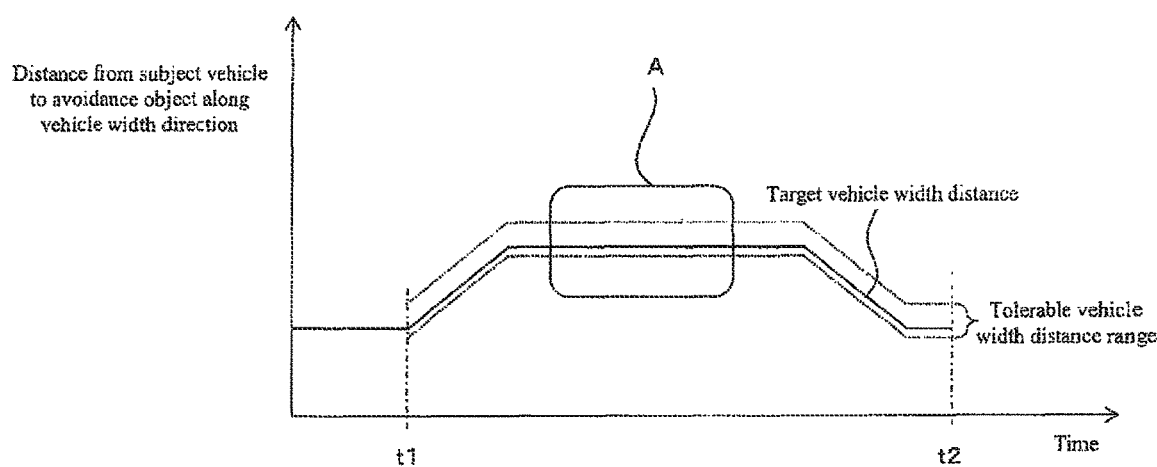
Figure 5B:
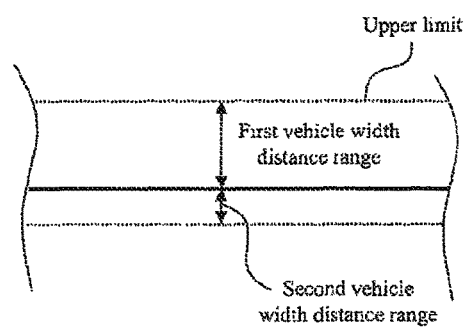
Figure 7:
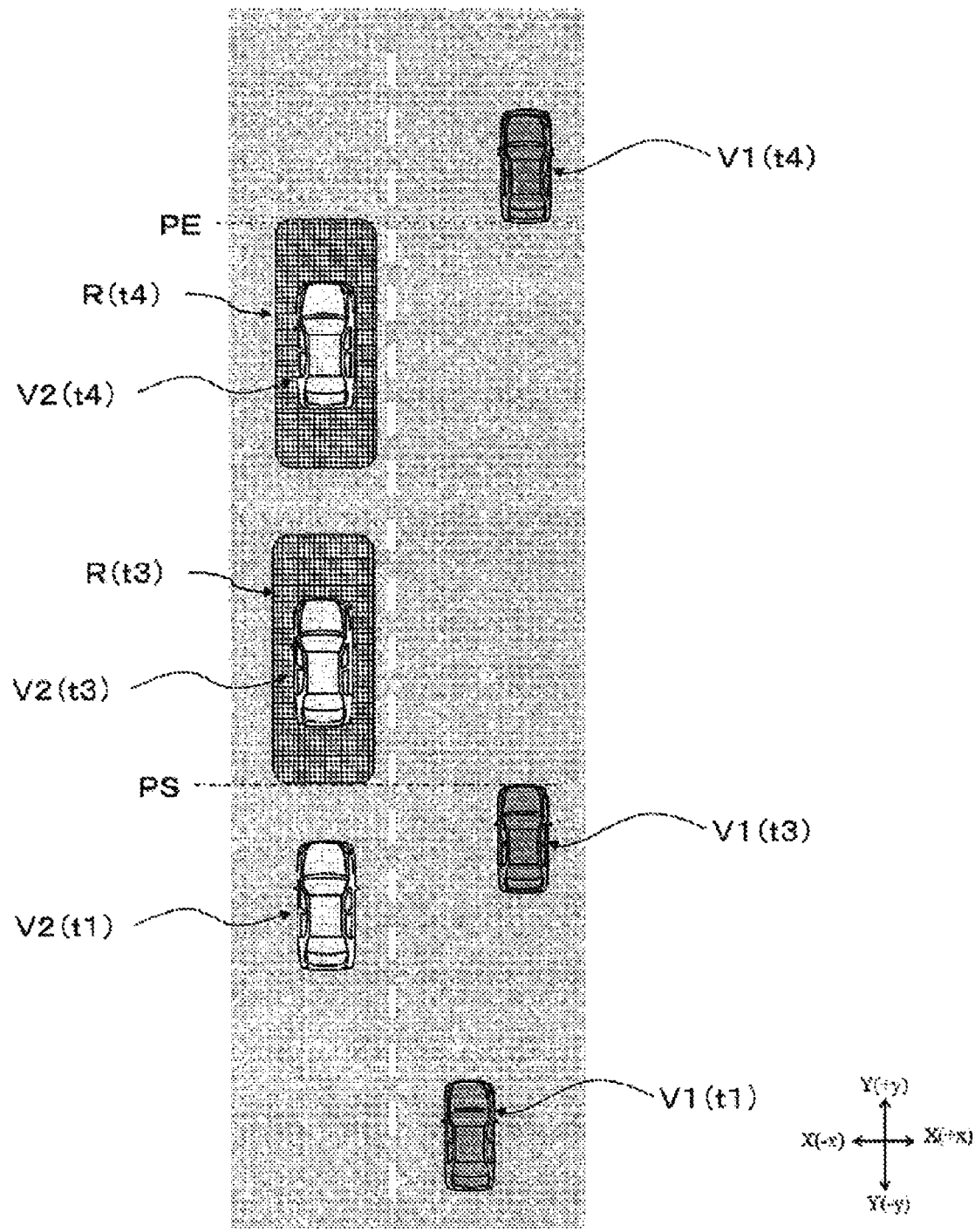
Figure 8A:
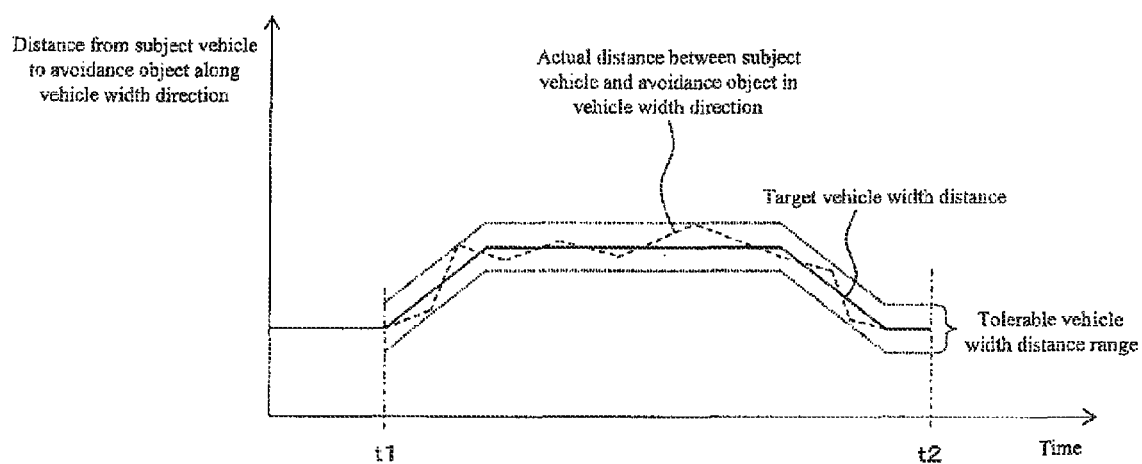
Figure 8B:
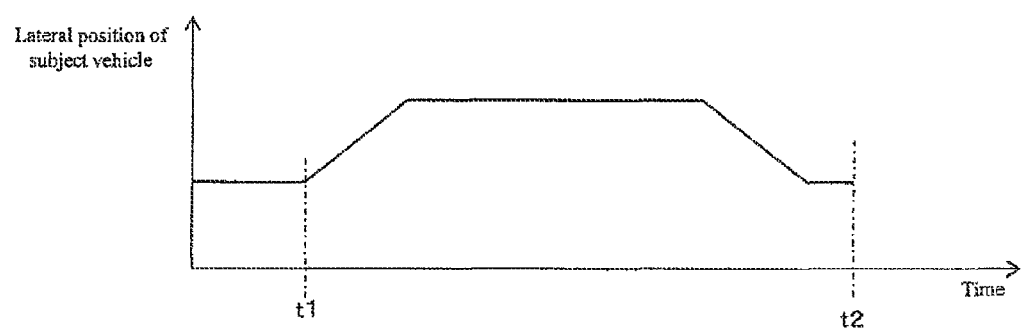
Figure 9:
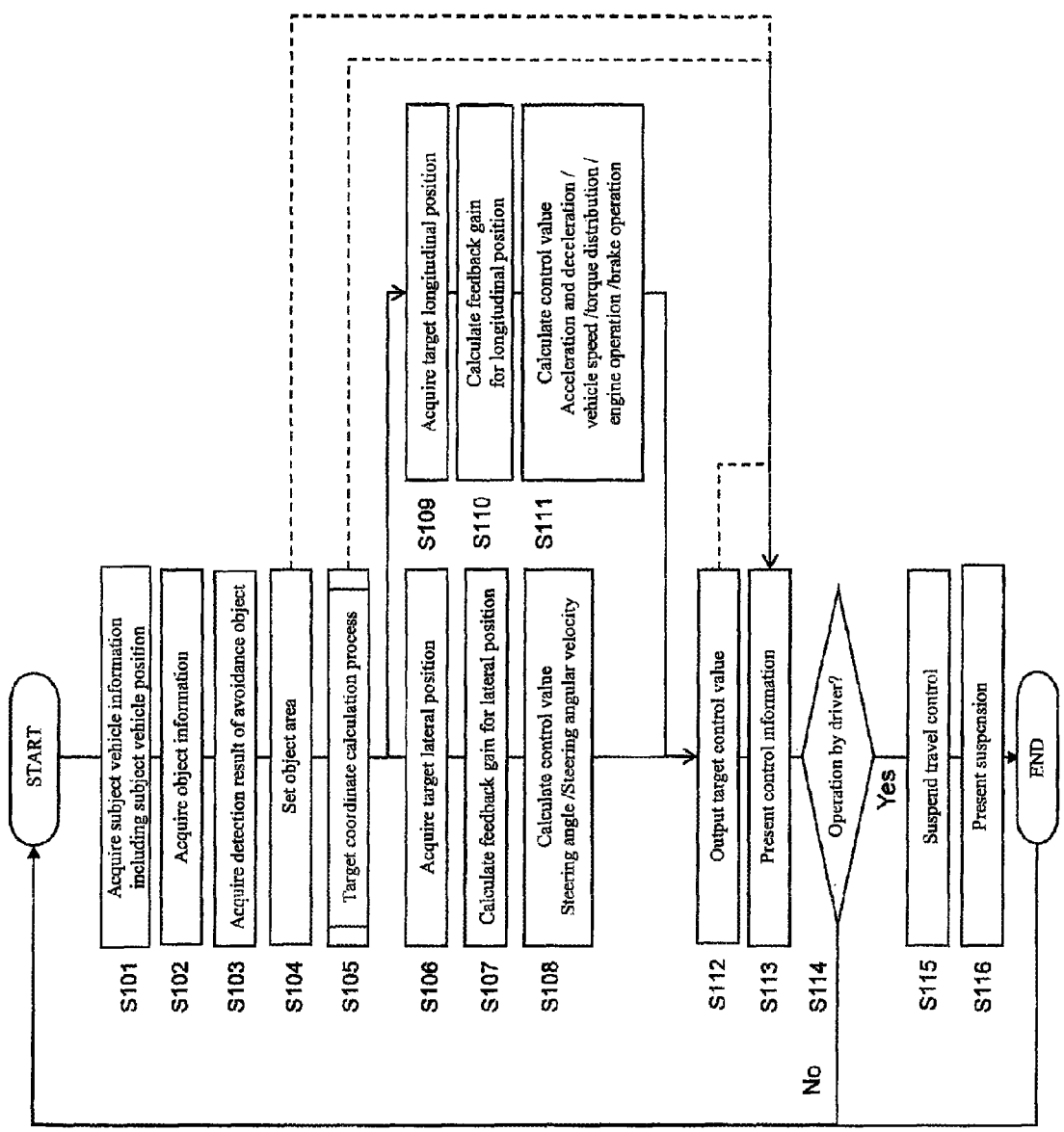
Figure 10:
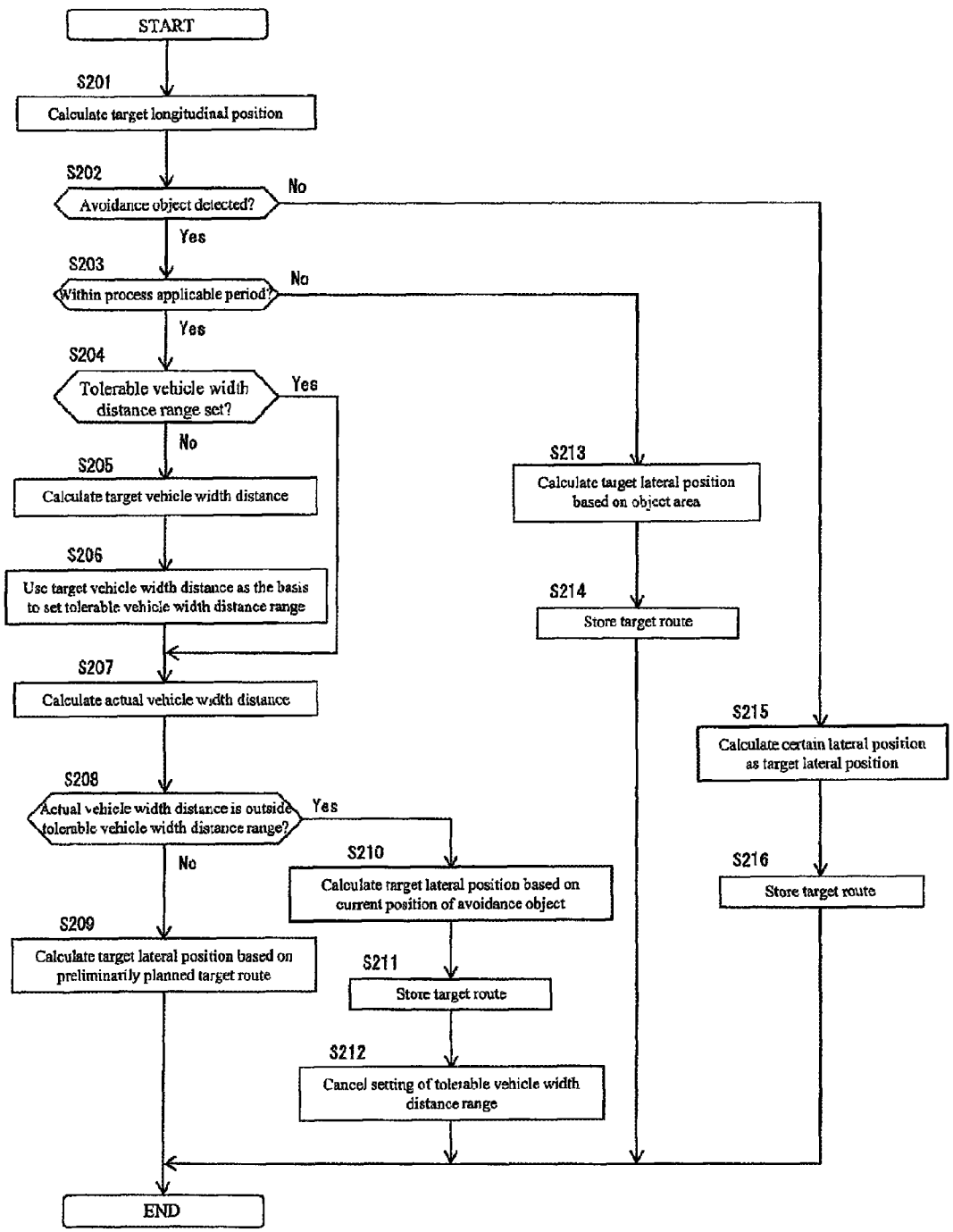

FIG. 5(A) and FIG. 5(B) are views for describing another method of setting a tolerable vehicle width distance range;

FIG. 6 is a view for describing still another method of setting a tolerable vehicle width distance range;

FIG. 7 is a view exemplifying a scene in which a subject vehicle overtakes an avoidance object;

FIG. 8(A) is a view illustrating an example of a tolerable vehicle width distance range and actual vehicle width distance;

FIG. 8(B) is a view illustrating a lateral position at which the subject vehicle travels in the scene illustrated in FIG. 8(A);

FIG. 9 is a flowchart illustrating a travel control process according to one or more embodiments of the present invention;

FIG. 10 is a flowchart illustrating a target coordinate calculation process of step S105; and FIG. 11 is a view for describing a travel control process using hysteresis.

DETAILED DESCRIPTION OF THE EMBODIMENTS

Hereinafter, one or more embodiments of the present invention is described with reference to the drawings. In the embodiments, the present invention is described by exemplifying examples in which the travel control device for a vehicle according to the present invention is applied to a travel control system equipped in a vehicle. Embodiments of the travel control device according to the present invention are not limited and can also be applied to a portable terminal device that can exchange information with the side of a vehicle. The travel control device, travel control system and portable terminal device are each a computer that executes a calculation process.

Figure 1:
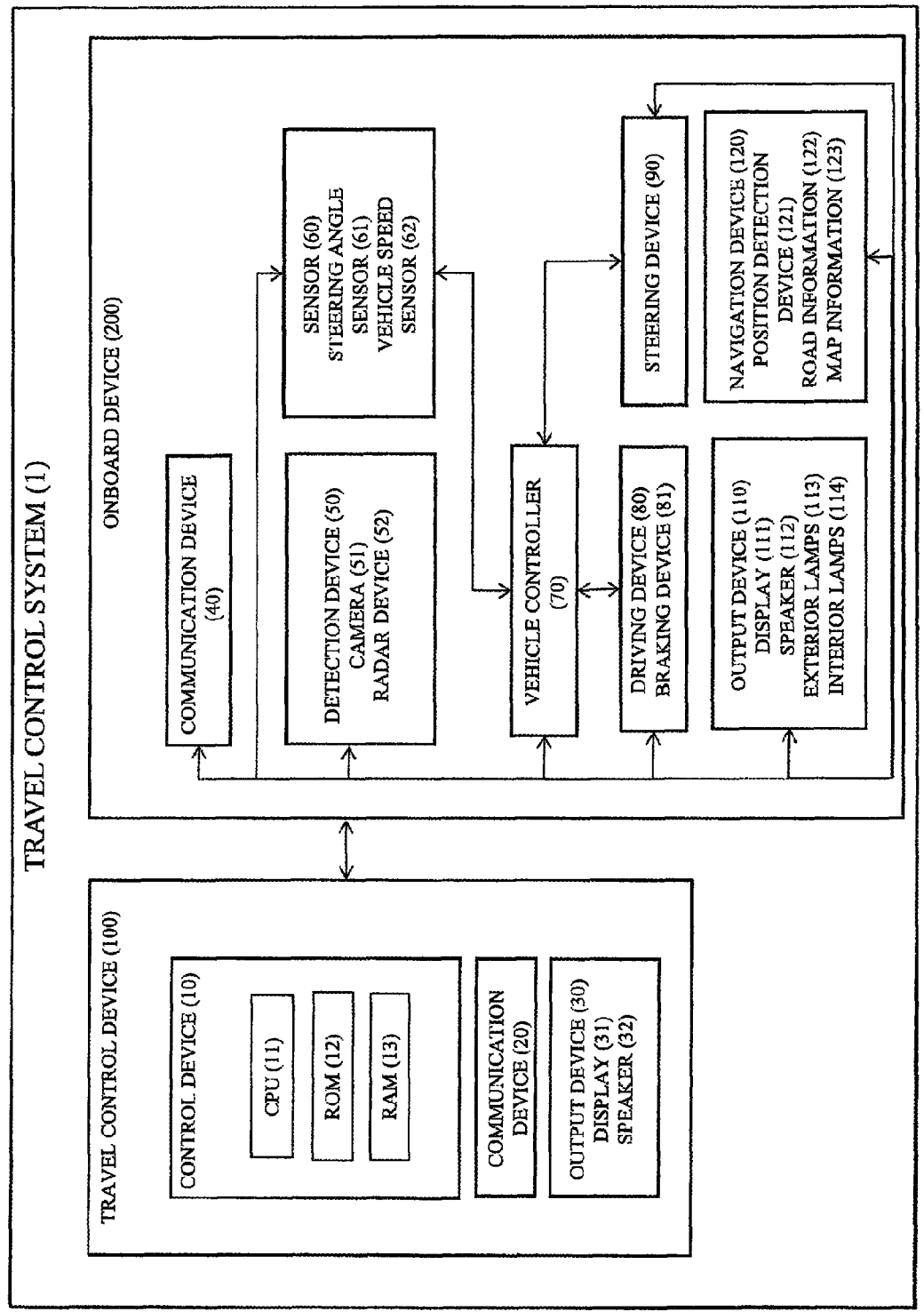
FIG. 1 is a block diagram of a travel control system according to one or more embodiments of the present invention.

FIG. 1 is a diagram illustrating a block configuration of a travel control system 1 according to one or more embodiments of the present invention. The travel control system 1 is equipped in a vehicle and comprises a travel control device 100 and an onboard apparatus 200.

The travel control device 100 according to one or more embodiments of the present invention has a lane departure prevention function (lane keep support function) to recognize a lane in which the subject vehicle is traveling and control travel of the subject vehicle so as to maintain a certain relationship between the position of a lane mark of the lane and the position of the subject vehicle. The travel control device 100 according to one or more embodiments of the present invention controls travel of the subject vehicle so that the subject vehicle travels along the center of a lane. The travel control device 100 may control travel of the subject vehicle so that the distance from the lane mark of a lane to the subject vehicle along the road width direction falls within a predetermined range.

The lane marker according to one or more embodiments of the present invention is not limited, provided that it has a function to define a lane. The lane marker may be a line drawn on a road surface, a planting that exists between roads, or a road structure that exists at the side of a road shoulder, such as a guardrail, curbstone, sidewalk, and exclusive road for two wheels. The lane marker may also be a fixed structure that exists at the side of a road shoulder, such as an advertising display, traffic sign, store, and roadside tree. The scheme of detecting such lane markers is not limited and various schemes such as pattern matching can be used which are known at the time of filing of the present application.

The travel control device 100 and the onboard apparatus 200 have communication devices 20 and 40, respectively, and exchange information with each other via wired or wireless communication.

The onboard apparatus 200 will first be described. The onboard apparatus 200 according to one or more embodiments of the present invention comprises a detection device 50, sensor 60, vehicle controller 70, driving device 80, steering device 90, output device 110, and navigation device 120. These devices which constitute the onboard apparatus 200 are connected to one another via a CAN (Controller Area Network) or other in-vehicle LAN to mutually exchange information.

These devices which constitute the onboard apparatus 200 will each be described below. The detection device 50 detects the existence of an avoidance object which the subject vehicle should avoid and its existence position. The detection device 50 according to one or more embodiments of the present invention includes, but is not limited to including, a camera 51. The camera 51 according to one or more embodiments of the present invention is, for example, a camera that comprises an imaging element, such as CCD. The camera 51 according to one or more embodiments of the present invention, which is installed in the subject vehicle, captures images around the subject vehicle and acquires data of images that include avoidance objects existing around the subject vehicle. Specific examples and the like of the "avoidance objects" described in one or more embodiments of the present invention is described later.

The detection device 50 processes the acquired image data to calculate the distance from the subject vehicle to an avoidance object on the basis of the position of the avoidance object relative to the subject vehicle. The detection device 50 also calculates, as object information, a relative speed and relative acceleration between the subject vehicle and the avoidance object from a variation over time of the position of the avoidance object. As for a process to calculate the positional relationship between the subject vehicle and another vehicle based on the image data and a process to calculate the speed information based on the amount of variation over time of the positional relationship, schemes known at the time of filing of the present application can be appropriately used.

In addition or alternatively, the detection device 50 may analyze the image data and identify the classification of the avoidance object on the basis of the analysis result. The detection device 50 can use a pattern matching technique or the like to identify whether the avoidance object included in the image data is a vehicle, pedestrian, or traffic sign. The detection device 50 can also extract the image of an object from the image data to identify a specific classification of the object (four-wheel car, two-wheel vehicle, bus, truck, construction vehicle, etc.) and a vehicle type (small-sized car, large-sized car) from the size and/or shape of the image. The detection device 50 can further identify the classification and vehicle type of the vehicle from an identifier that is represented by a license plate included in the image data. Such identification information can be used in a process to set an object area.

In addition or alternatively, the detection device 50 according to one or more embodiments of the present invention may use a radar device 52. Examples of the radar device 52 may be those, such as millimeter-wave radar, laser radar and ultrasonic radar, which are known at the time of filing of the present application.

The object information detected in such a manner, including at least the position of an avoidance object, is sent to the side of the travel control device 100. The detection device 50 may include various information items in the object information and send it to the side of the travel control device 100. Examples of such information items include relative speed information and relative acceleration information between the subject vehicle and the avoidance object obtained from the variation in position of the avoidance object, information on the classification of the avoidance object, and information on the vehicle type and the like when the avoidance object is a vehicle.

The "avoidance object" in one or more embodiments of the present invention refers to an object which the subject vehicle should avoid to travel (so that the subject vehicle does not excessively come close to the object). The detection device 50 detects an object having a certain positional relationship with the subject vehicle as the avoidance object. For example, the detection device 50 can detect, as the avoidance object, an object or the like that exists around the subject vehicle and within a predetermined distance from the subject vehicle.

Avoidance objects in one or more embodiments of the present invention include a stationary object and moving object. Examples of an avoidance object that is stationary include other vehicles that are parked, other vehicles that are stopped, road structures such as walkways, center dividers and guardrails, road equipment such as road signs and power or telephone poles, temporary objects on a road, such as falling objects and removed snow, which may be obstacles for a vehicle traveling. Examples of an avoidance object that is moving include other vehicles and pedestrians. Examples of such other vehicles include preceding vehicles, following vehicles and oncoming vehicles for the subject vehicle. Examples of vehicles include two-wheel vehicles such as bicycles and motorbikes, large-sized vehicles such as buses and trucks, and special-purpose vehicles such as trailers and crane cars. Examples of avoidance objects further include those in which objects may not necessarily exist but which the subject vehicle should avoid, such as construction sites, damaged areas of roads and waterholes.

The sensor 60 according to one or more embodiments of the present invention comprises a steering angle sensor 61 and vehicle speed sensor 62. The steering angle sensor 61 detects steering information regarding the steering, such as a steering amount, steering speed and steering acceleration of the subject vehicle, and sends the steering information to the vehicle controller 70 and the travel control device 100. The vehicle speed sensor 62 detects a speed and acceleration of the subject vehicle and sends them to the vehicle controller 70 and the travel control device 100.

The vehicle controller 70 according to one or more embodiments of the present invention is an onboard computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and internal combustion engine as the traveling drive sources. Examples of the electric car and hybrid car having an electric motor as the traveling drive source include a type in which the power source for the motor is a secondary battery and a type in which the power source for the motor is a fuel cell.

The driving device 80 according to one or more embodiments of the present invention comprises a drive mechanism of the subject vehicle V1. The drive mechanism includes an electric motor and/or internal-combustion engine as the above-described traveling drive source, a power transmission device including a drive shaft and automatic transmission that transmit the output of the traveling drive source to the drive wheels, and a braking device 81 that brakes wheels. The driving device 80 generates respective control signals for these components of the drive mechanism and executes the travel control including acceleration and deceleration of the vehicle. These control signals for the drive mechanism are generated on the basis of input signals by an accelerator operation and brake operation of the driver and control signals acquired from the vehicle controller 70 or from the travel control device 100. Command information may be sent to the driving device 80, which can thereby automatically perform the travel control including acceleration and deceleration of the vehicle. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention has a steering actuator. The steering actuator includes a motor and other necessary components attached to the steering column shaft. The steering device 90 executes the turning control for the vehicle on the basis of a control signal acquired from the vehicle controller 70 or an input signal by the steering operation of the driver. The vehicle controller 70 sends command information, including a steering amount, to the steering device 90 thereby to execute the turning control. In addition or alternatively, the travel control device 100 may control a braking quantity for each wheel of the vehicle thereby to execute the turning control. In this case, the vehicle controller 70 sends command information, including the braking quantity for each wheel, to the braking device 81 thereby to execute the turning control for the vehicle.

The navigation device 120 according to one or more embodiments of the present invention calculates a route from the current position of the subject vehicle to a destination and outputs route guidance information via the output device 110 which is described later. The navigation device 120 has a position detection device 121, road information 122 including a road type, road width, road shape and others, and map information 123 in which the road information 122 is associated with each point. The position detection device 121 according to one or more embodiments of the present invention is responsible to the Global Positioning System (GPS) and detects a position (latitude and longitude) at which the vehicle is traveling. The navigation device 120 specifies a road link on which the subject vehicle travels, on the basis of the current position of the subject vehicle detected by the position detection device 121. The road information 122 according to one or more embodiments of the present invention is stored such that identification information for each road link is associated with the road type, road width, road shape, whether or not the overtaking is permitted (whether or not the lane change to an adjacent lane is permitted), and other road-related information. The navigation device 120 refers to the road information 122 to acquire the information regarding a road to which the road link on which the subject vehicle travels belongs, and sends the information to the travel control device 100. The road type, road width and road shape of a road on which the subject vehicle travels are used in a travel control process to calculate (plan) a target route on which the subject vehicle is to travel.

The output device 110 according to one or more embodiments of the present invention outputs various information items regarding the travel assistance to the user or to passengers of surrounding vehicles. In one or more embodiments of the present invention, the output device 110 outputs at least one of information in accordance with the object information, information in accordance with the location of the object area, information in accordance with the location of the target route, and information in accordance with the command information for driving the subject vehicle on the target route. The output device 110 according to one or more embodiments of the present invention includes a display 111, speaker 112, exterior lamps 113, and interior lamps 114. The exterior lamps 113 include headlights, winker lamps, and brake lamps. The interior lamps 114 include lighting displays of indicators and lighting displays of the display 111 as well as lamps provided at the steering and lamps provided around the steering. The output device 110 according to one or more embodiments of the present invention may output various information items regarding the travel assistance to external devices, such as Intelligent Transport Systems (ITS) via the communication device 40. The external devices, such as Intelligent Transport Systems use the information regarding the travel assistance, including the speed of the vehicle, steering information, traveling route, etc., for the traffic management of a plurality of vehicles.

Specific forms of outputting information is described with reference to an example in which a parked vehicle as the avoidance object exists at the forward left side of the subject vehicle.

The output device 110 provides passengers of the subject vehicle with a direction and/or position in which the parked vehicle exists, as the information in accordance with the object information. The display 111 displays the direction and/or position in which the parked vehicle exists in a form that can be visually recognized. The speaker 112 reads out a text that informs the direction and/or position in which the parked vehicle exists, such as "Please be advised a parked vehicle exists at the forward left side." Among lamps provided as the exterior lamps 113 at left and right door mirrors, only the left-side lamp may be blinked to inform the subject vehicle's passengers that a parked vehicle exists at the forward left side. Among lamps provided as the interior lamps 114 at the left and right in the vicinity of the steering, only the left-side lamp may be blinked to inform the passengers that a parked vehicle exists at the forward left side.

A direction and/or position in which the object area is set may be output via the output device 110 as the information in accordance with the location of the object area. The passengers can be informed that an object area is set at the forward left side, in a similar manner to the above, via the display 111, speaker 112, exterior lamps 113, and/or interior lamps 114.

In one or more embodiments of the present invention, in view of preliminarily informing other vehicles' passengers of the moving behavior of the subject vehicle, the direction and/or position in which the object area is set may be output to the external using the exterior lamps 113. After the object area is set, the travel direction of the subject vehicle is changed (turning is performed) to pass by the side of the object area. By informing the external of the object area being set, the drivers of other vehicles can be preliminarily noticed that the travel direction of the subject vehicle is changed to pass by the side of the object area. For example, when the object area is set at the frontward left side, right-side winker lamps (exterior lamps 113) may be lighted to inform the external other vehicles and the like that the subject vehicle will deviate rightward to pass by the side of the object area which is set at the left side.

Further, the passengers can be informed of the shape of the target route and/or the position of a curve point as the information in accordance with the location of the target route, by the display 111 and/or the speaker 112. The display 111 displays the shape and the like of the target route as a diagrammatic view that can be visually recognized. The speaker 112 outputs an announcement, such as "To pass by the side of the parked vehicle ahead, the steering is turned to the right."

Furthermore, passengers of the subject vehicle or passengers of other vehicles may be preliminarily informed that the turning operation and/or acceleration or deceleration is performed, as the information in accordance with the command information for driving the subject vehicle on the target route, via the display 111, speaker 112, exterior lamps 113 and/or interior lamps 114.

Thus, by outputting the information regarding the travel control when passing by the side of the object area, passengers of the subject vehicle and/or other vehicles can be preliminarily informed of the behavior of the subject vehicle. The output device 110 may output the above-described information to external devices such as the Intelligent Transport Systems via the communication device 20. This allows the passengers of the subject vehicle and/or the passengers of other vehicles to respond to the behavior of the subject vehicle which is under the travel control.

The travel control device 100 according to one or more embodiments of the present invention will then be described.

As illustrated in FIG. 1, the travel control device 100 according to one or more embodiments of the present invention comprises a control device 10, communication device 20, and output device 30. The communication device 20 exchanges information with the onboard apparatus 200. The output device 30 has a similar function to that of the previously-described output device 110 of the onboard apparatus 200. When the travel control device 100 is a computer that can be carried by a passenger, the travel control device 100 may output, to each device, command information for controlling the blinking of the exterior lamps 113 and/or interior lamps 114 of the onboard apparatus 200.

The control device 10 of the travel control device 100 is a computer comprising: a ROM (Read Only Memory) 12 that stores programs for controlling travel of the subject vehicle; a CPU (Central Processing Unit) 11 as an operation circuit that executes the programs stored in the ROM 12 to function as the travel control device 100; and a RAM (Random Access Memory) 13 that functions as an accessible storage device.

The control device 10 of the travel control device 100 according to one or more embodiments of the present invention has a subject vehicle information acquisition function, object information acquisition function, object area setting function, target route planning function, control function, and presentation function. The control device 10 according to one or more embodiments of the present invention executes each function by cooperation of software for realizing the above functions and the above-described hardware.

Each function of the travel control device 100 according to one or more embodiments of the present invention is described below.

First, the subject vehicle information acquisition function of the control device 10 is described. The control device 10 acquires subject vehicle information that includes the position of the subject vehicle by the subject vehicle information acquisition function. The position of the subject vehicle can be acquired by the position detection device 121 of the navigation device 120. The subject vehicle information further includes the vehicle speed and acceleration of the subject vehicle. The control device 10 acquires the speed of the subject vehicle from the vehicle speed sensor 62. The speed of the subject vehicle can also be acquired on the basis of a variation over time of the position of the subject vehicle. The acceleration of the subject vehicle can be obtained from the speed of the subject vehicle.

The object information acquisition function of the control device 10 is described. The control device 10 acquires object information that includes the position of an avoidance object which the subject vehicle should avoid. The control device 10 acquires the object information which includes the position of the avoidance object detected by the detection device 50. The object information further includes a relative position, relative speed and relative acceleration of the avoidance object.

When the avoidance object is another vehicle and this other vehicle and the subject vehicle are capable of inter-vehicle communication, the control device 10 of the subject vehicle may acquire, as the object information, the vehicle speed and acceleration of the other vehicle detected by the vehicle speed sensor of the other vehicle. As is understood, the control device 10 can also acquire the object information which includes the position, speed and acceleration of the other vehicle from external devices such as the Intelligent Transport Systems.

Figure 2:
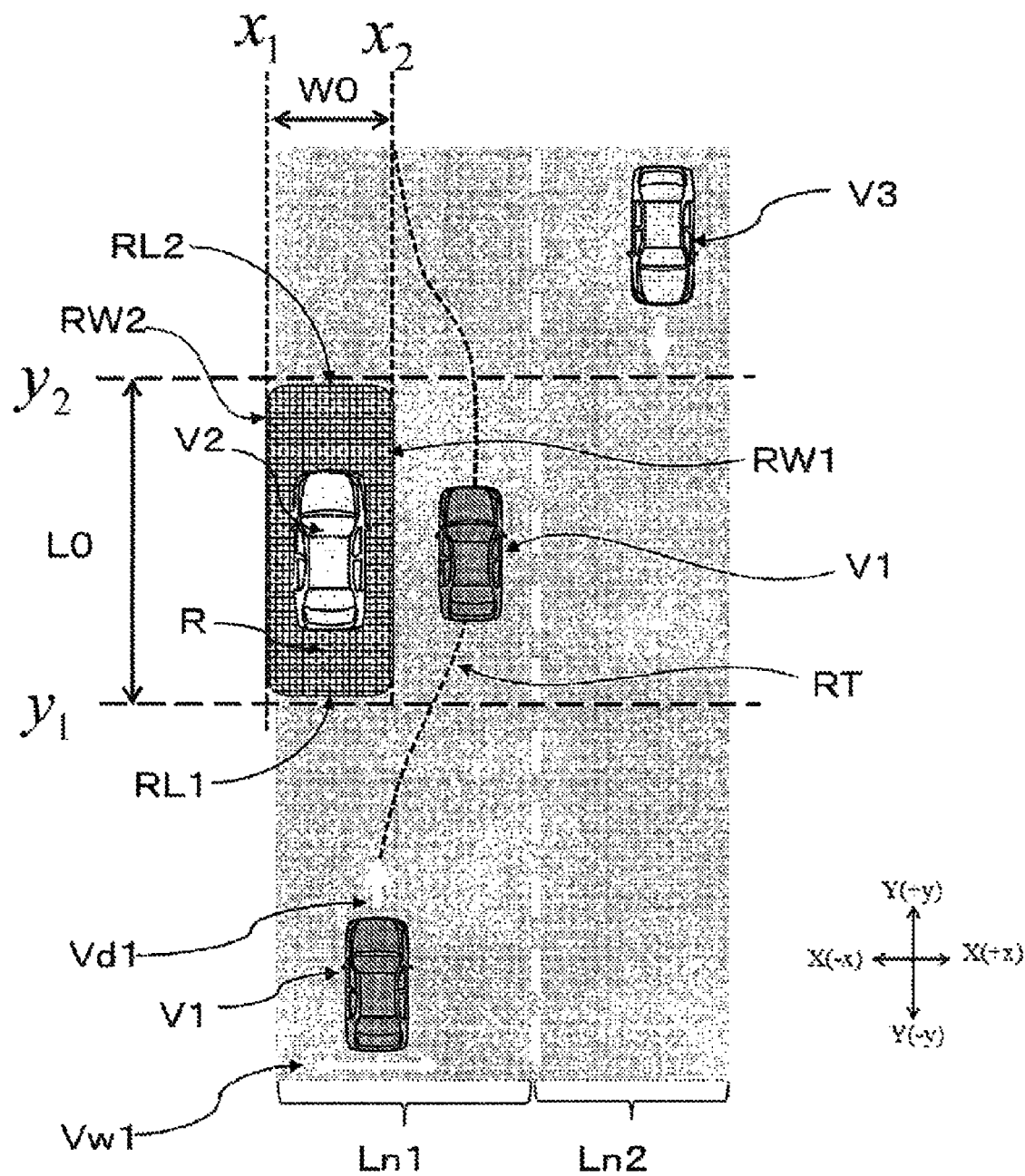
FIG. 2 is a view for describing a process to set an object area.

The control device 10 set an object area R on the basis of the relationship between the position of the subject vehicle and the position of the avoidance object by the object area setting function. FIG. 2 is a view illustrating an example of a scheme to set the object area R. In FIG. 2, the travel direction Vd1 of the subject vehicle is +y direction in the figure. In FIG. 2, the extending direction of a travel lane Ln1 in which the subject vehicle travels is also +y direction in the figure.

FIG. 2 is a view when viewing from above a scene of detecting another vehicle V2 that is parked at the left-side road shoulder of the travel lane Ln1 for the subject vehicle. The detected other vehicle V2 exists in the travel lane Ln1 for the subject vehicle V1 and is therefore an avoidance object which the subject vehicle V1 should avoid because the other vehicle V2 will interfere the subject vehicle V1 traveling straight ahead. The control device 10 sets a region that includes the other vehicle V2, as the object area R.

As illustrated in FIG. 2, when the travel direction Vd1 of the subject vehicle is defined as the forward direction while its reverse direction is defined as the backward direction, the object area R has longitudinal end parts RL1 and RL2 at the rear side and front side of the object area R, respectively. These longitudinal end parts RL1 and RL2 represent end lines that define the length of the object area R along the extending direction (+y) of the travel lane Ln1 for the subject vehicle. The length of the object area R illustrated in FIG. 2 along the extending direction (+y) of the travel lane Ln1 is L0 that is a distance between the longitudinal end part RL1 (y1) and the longitudinal end part RL2 (y2). Among the longitudinal end parts RL1 and RL2, the longitudinal end part located at near side (upstream side) when viewed from the subject vehicle V1 approaching the object area RO is defined as a first end part RL1. On the other hand, among the longitudinal end parts RL1 and RL2, the longitudinal end part located at far side (downstream side) when viewed from the subject vehicle V1 approaching or passing by the object area R is defined as a second end part RL2. The first end part RL1 and the second end part RL2 are located on the boundary of the object area R.

As illustrated in FIG. 2, when the vehicle width direction of the subject vehicle is defined as Vw1 (X-direction in the figure), the object area R has lateral end parts RW1 and RW2 at the right side and left side of the object area R, respectively. These lateral end parts RW1 and RW2 are end lines (end parts) that define distances from the subject vehicle V1 along the vehicle width direction. These lateral end parts RW1 and RW2 are also end lines that define the length (width) of the object area along the road width direction (X) of the travel lane Ln1 for the subject vehicle. The length of the object area R illustrated in FIG. 2 along the road width direction (X) is W0 that is a distance between the lateral end part RW1 (x1) and the lateral end part RW2 (x2). When the subject vehicle comes close to the avoidance object V2 along the vehicle width direction, among the lateral end parts RW1 and RW2 of the object area R, the lateral end part located at the side of the subject vehicle V1 when viewed from the subject vehicle V1 is defined as a first lateral end part RW1. On the other hand, among the lateral end parts RW1 and RW2, the lateral end part located at the side (road shoulder side) opposite to the side of the subject vehicle V1 when viewed from the subject vehicle V1 is defined as a second lateral end part RW2. The first lateral end part RW1 and the second lateral end part RW2 are located on the boundary of the object area R.

When, as illustrated in FIG. 2, there is another vehicle V3 traveling in the opposite direction in an oncoming lane Ln2 of the travel lane Ln1 for the subject vehicle V1, the other vehicle V3 is detected as an avoidance object. Although not illustrated in the figure, when the other vehicle V3 is detected as an avoidance object, an object area is set within a region that includes the other vehicle V3, in the same manner. The object area R is set at the timing of detecting an avoidance object, that is, the timing before the turning operation of the subject vehicle V1 is performed.

The control device 10 calculates a target route RT on the basis of the location of the boundary of the object area R which is set as the above by the target route planning function to. Here, "calculating a target route RT on the basis of the location of the object area R" may refer to calculating the target route RT such that the subject vehicle V1 does not enter the object area R, calculating the target route RT such that an area at which the object area R and a possible existence area of the subject vehicle V1 overlap each other is less than a predetermined value, calculating a sequence of positions separate from the boundary of the object area R by a predetermined distance as the target route RT, or calculating the boundary itself of the object area R as the target route RT. As previously described, the object area R is set such that the distance between the subject vehicle V1 and the avoidance object does not become less than a predetermined value or such that the distance between the subject vehicle V1 and the avoidance object is maintained at a predetermined threshold. Consequently, the target route RT is also set at a location at which the distance between the subject vehicle V1 and the avoidance object does not become less than the predetermined value or at a location at which the distance between the subject vehicle V1 and the avoidance object is maintained at the predetermined threshold.

The control device 10 outputs the command information for driving the subject vehicle V1 on the target route RT to the vehicle controller 70, driving device 80, and steering device 90. Acquiring the command information from the control device 10, the vehicle controller 70 controls the driving device 80 and steering device 90 to drive the subject vehicle V1 along the target route RT. The vehicle controller 70 performs control of the steering device 90 such that the subject vehicle travels while maintaining a certain lateral position to the lane, using the road shape detected by the detection device 50, the road information 122 from the navigation device 120, and a lane marker model stored in the map information 123. The vehicle controller 70 calculates a turning control amount on the basis of the steering angle acquired from the steering angle sensor 61, the vehicle speed acquired from the vehicle speed sensor 62, information on the current for a steering actuator and the like, and sends a current command to the steering actuator to perform the control such that the subject vehicle travels at a target lateral position.

The method of controlling the lateral position of the subject vehicle V1 is not limited to using the above-described steering device 90. In addition or alternatively, the driving device 80 and/or the braking device 81 may be used to control the travel direction (i.e. lateral position) of the subject vehicle V1 on the basis of the rotational speed difference between the right and left drive wheels. In this sense, the "turning" of a vehicle is intended to encompass the cases of using the driving device 80 and/or the braking device 81 in addition to the cases of using the steering device 90.

As described above, in one or more embodiments of the present invention, when an avoidance object is detected, an object area R that includes the avoidance object is set and a target route RT is planned so as to pass by the side of the object area R. Moreover, in one or more embodiments of the present invention, detection of an avoidance object, setting of an object area R, calculation of a target route RT, and travel control based on the target route RT are repeatedly performed at regular intervals. This allows the control device 10 to sequentially plan the target route RT for the subject vehicle V1 on the basis of the updated surrounding situations around the subject vehicle V1. Therefore, the subject vehicle V1 can travel on a route suitable for the surrounding situations around the subject vehicle V1.

When the target route RT for the subject vehicle V1 is set in this manner, if the avoidance object is, for example, another vehicle V2 that travels side by side with the subject vehicle V1 and this other vehicle V2 travels while swaying from side to side, the target route RT is repeatedly planned at different routes in accordance with the position of the swaying other vehicle V2 and consequently the subject vehicle V1 may also sway from side to side. In one or more embodiments of the present invention, therefore, the control device 10 performs travel control for the subject vehicle V1 as below in order to mitigate the sway of the subject vehicle V1 due to the sway of the other vehicle V2.

That is, in one or more embodiments of the present invention, the control device 10 determines whether to drive the subject vehicle V1 on the basis of a preliminarily planned target route RT or to drive the subject vehicle V1 on the basis of the new target route RT which is newly set on the basis of the current position of the avoidance object. This determination is based on the distance between the subject vehicle V1 and the avoidance object along the vehicle width direction.

Specifically, the control device 10 first sets, as a tolerable vehicle width distance range, a range of fluctuating distance that allows the subject vehicle V1 to travel on a preliminarily set target route RT even when the distance between the subject vehicle V1 and the avoidance object along the vehicle width direction fluctuates (a method of setting the tolerable vehicle width distance range is described later).

Then, the control device 10 determines whether or not the actual distance between the subject vehicle V1 and the avoidance object along the vehicle width direction (referred to as an "actual vehicle width distance," hereinafter) is within the tolerable vehicle width distance range. When the actual vehicle width distance is within the tolerable vehicle width distance range, the control device 10 does not newly plan a target route RT and drives the subject vehicle V1 on the preliminarily planned target route RT. On the other hand, when the actual vehicle width distance is outside the tolerable vehicle width distance range, the control device 10 newly plans a target route RT on the basis of the current position of the avoidance object and drives the subject vehicle V1 on the newly planned target route RT.

In a scene in which the subject vehicle V1 overtakes the avoidance object as illustrated in FIG. 2, the control device 10 controls the subject vehicle V1 so that the subject vehicle V1 starts turning to pass by the side of the avoidance object and returns to a certain lateral position (e.g. lateral position before starting the overtaking) to travel straight ahead after the subject vehicle V1 overtakes the avoidance object. The period within which this sequence of control processes is performed may be considered as a process applicable period, within which the above-described travel control process can be performed. In another configuration, the period from when the subject vehicle V1 starts turning to pass by the side of the avoidance object until a predetermined time passes may be considered as a process applicable period, within which the above-described travel control process can be performed. In still another configuration, also in a scene in which the subject vehicle V1 passes by the avoidance object such as an oncoming vehicle V3, the period from when the subject vehicle V1 starts turning to pass by the side of the avoidance object until the subject vehicle V1 passes by the avoidance object and returns to a certain lateral position (e.g. center position of the travel lane) to travel straight ahead may be considered as a process applicable period, within which the above-described travel control process can be performed.

Figure 3:
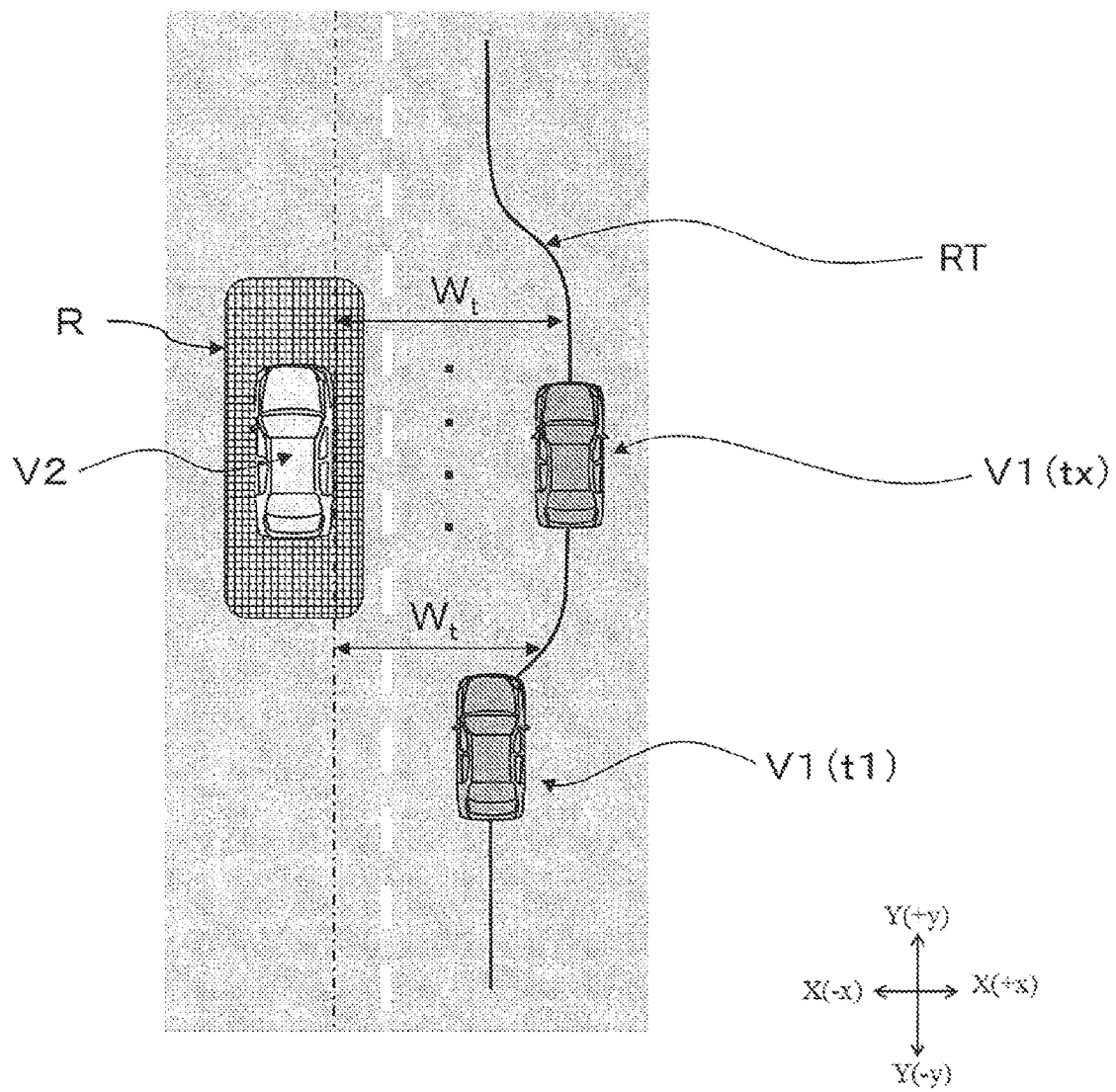
FIG. 3 is a view for describing a method of calculating a target vehicle width distance.
Figure 4:
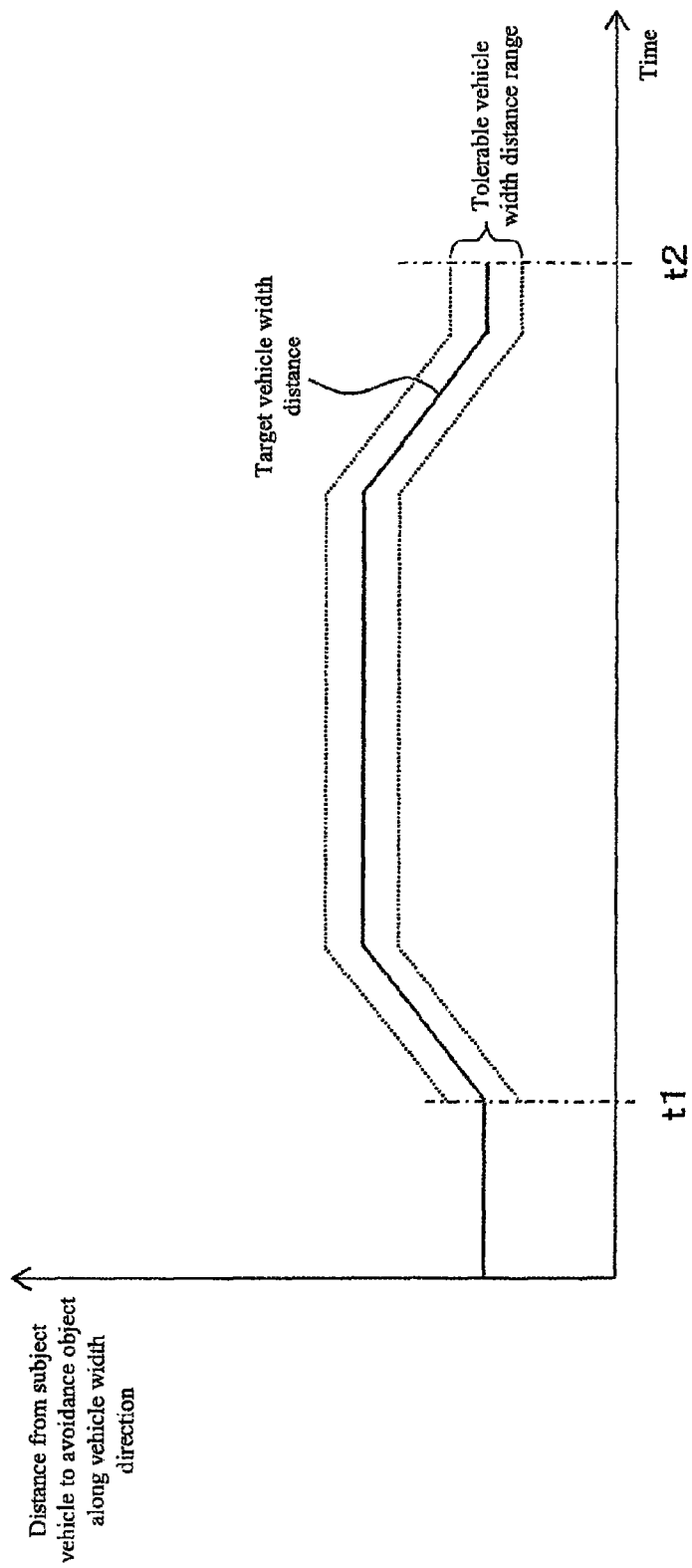
FIG. 4 is a view for describing a method of setting a tolerable vehicle width distance range.

A method of setting the tolerable vehicle width distance range will then be described. FIG. 3 is a view exemplifying a scene in which the subject vehicle V1 and another vehicle V2 as the avoidance object travel side by side with each other and the subject vehicle V1 overtakes the other vehicle V2. FIG. 4 is a view for describing a method of setting the tolerable vehicle width distance range which is set in the scene illustrated in FIG. 3. In FIG. 4, time t1 is the time when the subject vehicle V1 starts turning to pass by the side of the avoidance object and time t2 is the time when the subject vehicle V1 has completed overtaking of the avoidance object and returns to a certain lateral position to start traveling straight ahead or the time when a predetermined time has passed from when the turning was started. That is, the period from time t1 to time t2 in FIG. 4 is the above-described process applicable period (the same applies to FIG. 5 to FIG. 8).

For example, in the example illustrated in FIG. 3, the control device 10 repeatedly detects the position of the other vehicle V2 and repeatedly calculates the target route RT in accordance with the position of the other vehicle V2 from before the subject vehicle V1 starts turning to pass by the side of the other vehicle V2 (e.g. from before the subject vehicle V1 comes to the position of time t1 in the example illustrated in FIG. 3). Then, when the subject vehicle V1 starts turning to pass by the side of the other vehicle V2 (when the subject vehicle V1 comes to the position of time t1 in the example illustrated in FIG. 3), the control device 10 calculates each distance $W_t$ from the subject vehicle V1 to the current position of the avoidance object along the vehicle width direction as a target vehicle width distance so that, as illustrated in FIG. 3, the subject vehicle V1 travels on the target route RT which is set when the turning is started. Then, as illustrated in FIG. 4, the control device 10 uses the target vehicle width distance as the basis to set a certain distance range, which includes the target vehicle width distance, as the tolerable vehicle width distance range.

In one or more embodiments of the present invention, the control device 10 can take into account the following factors to set the width of a tolerable vehicle width distance range.

First, the control device 10 can take into account the traveling speed of the subject vehicle V1 to set the width of the tolerable vehicle width distance range. Specifically, when the traveling speed of the subject vehicle V1 is a predetermined speed or higher, the control device 10 can set the tolerable vehicle width distance range to have a wider width than a width of the tolerable vehicle width distance range which is set when the traveling speed of the subject vehicle V1 is lower than the predetermined speed. Through this operation, when the traveling speed of the subject vehicle V1 is high, the subject vehicle V1 can be more effectively prevented from swaying and an uncomfortable feeling given to the passengers can thus be mitigated.

Second, the control device 10 can take into account the width of a road on which the subject vehicle V1 travels, to set the width of the tolerable vehicle width distance range. Specifically, when the width of a road on which the subject vehicle V1 travels is a predetermined value or smaller, the control device 10 can set the tolerable vehicle width distance range to have a wider width than a width of the tolerable vehicle width distance range which is set when the width of the road is larger than the predetermined value. Through this operation, when the width of a road on which the subject vehicle V1 travels is narrow, an uncomfortable feeling given to the passengers due to the subject vehicle V1 swaying can be more effectively prevented.

Third, the control device 10 can take into account the type of a road on which the subject vehicle V1 travels, to set the width of the tolerable vehicle width distance range. For example, when the type of a road on which the subject vehicle V1 travels is a highway, the control device 10 can set the tolerable vehicle width distance range to have a wider width than a width of the tolerable vehicle width distance range which is set when the type of a road on which the subject vehicle V1 travels is a general road. Also in this case, the swaying of the subject vehicle V1 can be effectively prevented in an environment in which the traveling speed of the subject vehicle V1 may be high.

Fourth, when a road on which the subject vehicle V1 travels has a plurality of lanes, the control device 10 can set the width of the tolerable vehicle width distance range in accordance with the lane in which the subject vehicle V1 travels. For example, when the road on which the subject vehicle V1 travels is a six-lane road and the subject vehicle V1 travels on overtaking lane that has the highest priority for overtaking, the width of the tolerable vehicle width distance range can be the widest. Also in this case, the swaying of the subject vehicle V1 can be effectively prevented in an environment in which the traveling speed of the subject vehicle V1 may be high.

In addition or alternatively, the control device 10 can set the width of the tolerable vehicle width distance range as below. FIG. 5(A) is a view for describing another example of a method of setting the tolerable vehicle width distance range and FIG. 5(B) is an enlarged view of part A illustrated in FIG. 5(A). For example, as illustrated in FIG. 5(B), when a first vehicle width distance range is a part of the tolerable vehicle width distance range in which the distance is larger than the target vehicle width distance (a part of the tolerable vehicle width distance range outside the target vehicle width distance) and a second vehicle width distance range is a part of the tolerable vehicle width distance range in which the distance is smaller than the target vehicle width distance (a part of the tolerable vehicle width distance range inside the target vehicle width distance), the control device 10 can set the tolerable vehicle width distance range such that the second vehicle width range is narrower than the first vehicle width distance range. In this case, when the subject vehicle V1 comes close to the avoidance object, the subject vehicle V1 can sensitively respond to the moving behavior of the subject vehicle V1 while when the subject vehicle V1 comes away from the avoidance object, the subject vehicle V1 can be prevented from swaying due to following the moving behavior of the avoidance object. In another configuration, the width of the second vehicle width distance range may be zero and only the first vehicle width distance range may be set in the direction in which the subject vehicle V1 comes away from the avoidance object. In still another configuration, the upper limit of the first vehicle width distance range may not be provided and when the subject vehicle V1 comes away from the avoidance object, the subject vehicle V1 may be driven along the preliminarily plan target route RT regardless of the distance between the subject vehicle V1 and the avoidance object along the vehicle width direction.

When the subject vehicle V1 passes by the side of an avoidance object, as illustrated in FIG. 6, the control device 10 can set the tolerable vehicle width distance range to have different widths in a section A before the subject vehicle V1 starts to overtake the avoidance object, in a section B in which the subject vehicle V1 is overtaking the avoidance object, and in a section C after the subject vehicle V1 has completed overtaking of the avoidance object.

FIG. 7 is a view exemplifying a scene in which the subject vehicle V1 overtakes another vehicle V2 as the avoidance object. FIG. 7 illustrates positions of the subject vehicle V1 and other vehicle V2 at each of time t1, t3, and t4. For example, in the example illustrated in FIG. 7, the control device 10 detects a position at which the distance between the front end of the traveling subject vehicle V1 and the object area R becomes less than a predetermined distance (including zero), as an overtaking start position PS, and can set a section from a point at which the subject vehicle V1 starts turning to a point at which the subject vehicle V1 reaches the overtaking start position PS, as the section A.

In the example illustrated in FIG. 7, for example, the other vehicle V2 as the avoidance object travels in the same travel direction as the subject vehicle V1. Therefore, taking into account the relative speed between the subject vehicle V1 and the other vehicle V2, the control device 10 determines that the distance between the front end of the subject vehicle V1 (t3) and the rear end RL1 of the object area R (t3) becomes less than the predetermined distance at time t3, and can detect the position of the subject vehicle V1 at time t3 as the overtaking start position PS. The distance between the front end of the subject vehicle V1 and the object area R may preferably be the distance along the travel direction of the subject vehicle V1, but can also be the direct distance connecting between the front end of the subject vehicle V1 and the object area R.

The control device 10 detects a position at which the distance between the rear end of the subject vehicle V1 and the object area R decreases and then increases, as an overtaking completion position PE, and can set a section from a point at which the subject vehicle V1 reaches the overtaking start position PS to a point at which the subject vehicle V1 then reaches the overtaking completion position PE, as the section B. The control device 10 can set a section from a point at which the subject vehicle V1 has completed overtaking of the avoidance object to a point at which the subject vehicle V1 then returns to a predetermined lateral position, as the section C.

Here, when the subject vehicle V1 overtakes the avoidance object, the distance between the rear end of the subject vehicle V1 and the object area R decreases as the subject vehicle V1 comes close to the avoidance object before the overtaking of the avoidance object is completed, and increases as the subject vehicle V1 comes away from the avoidance object after the overtaking of the avoidance object is completed. Therefore, the position at which the distance between the rear end of the subject vehicle V1 and the object area R decreases and then increases is the position PE at which the overtaking is completed. For example, in the example illustrated in FIG. 7, taking into account the relative speed between the subject vehicle V1 and the other vehicle V2, the control device 10 determines that the distance between the rear end of the subject vehicle V1 (t4) and the front end RL2 of the object area R (t4) decreases and then increases at time t4, and can detect the position of the subject vehicle V1 at time t4 as the overtaking completion position PE. The distance between the rear end of the subject vehicle V1 and the object area R may preferably be the distance along the travel direction of the subject vehicle V1, but can also be the direct distance connecting between the rear end of the subject vehicle V1 and the object area R.

Then, as illustrated in FIG. 6, the control device 10 can set the widths of the tolerable vehicle width distance range corresponding to the sections A and C to be narrower than the width of the tolerable vehicle width distance range corresponding to the section B. In sections A and C, the distance between the subject vehicle V1 and the avoidance object along the road width direction is shorter than that in the section B. Therefore, the tolerable vehicle width distance range is set narrower in the sections A and C thereby to allow the subject vehicle V1 to rapidly come away from the avoidance object when the avoidance object comes closer to the subject vehicle V1 along the road width direction.

In another embodiment, the control device 10 may be configured to set the tolerable vehicle width distance range only in the sections A and B among the sections A to C illustrated in FIG. 6. In still another embodiment, the control device 10 may be configured to set the tolerable vehicle width distance range only in the section B. In yet another embodiment, the control device 10 may be configured to set the tolerable vehicle width distance range only in a part of the section B. Thus, the tolerable vehicle width distance range is set in a section in which the distance between the subject vehicle V1 and the avoidance object along the vehicle width direction is relatively long, and it is thereby possible to effectively prevent the sway of the subject vehicle V1 due to the sway of the avoidance object when the avoidance object and the subject vehicle V1 are away from each other.

The above-described example exemplifies a scene in which the subject vehicle V1 overtakes the avoidance object which travels side by side with the subject vehicle V1, but also in a scene in which the subject vehicle V1 overtakes an avoidance object that is stopped, the sections A to C may be set in a similar manner and the width of the tolerable inter-vehicle distance range can be set for each of the sections A to C. Also in a scene in which the subject vehicle V1 passes by an oncoming vehicle V3 as the avoidance object, the sections A to C may be set in a similar manner and the width of the tolerable inter-vehicle distance range can be set for each of the sections A to C. That is, a position at which the distance between the front end of the subject vehicle V1 and the object area R including the oncoming vehicle V3 becomes less than a predetermined distance (including zero) may be detected as a passing start position PS, and a position at which the distance between the rear end of the subject vehicle V1 and the object area R including the oncoming vehicle V3 decreases and then increases may be detected as an overtaking completion position PE. The sections A to C can thereby be set.

After setting the tolerable vehicle width distance range as illustrated in FIG. 4 to FIG. 6, the control device 10 repeatedly calculates an actual distance between the subject vehicle V1 and the avoidance object along the vehicle width direction (actual vehicle width distance) and repeatedly determines whether or not the actual vehicle width distance is outside the tolerable vehicle width distance range. When the actual vehicle width distance is within the tolerable vehicle width distance range, the control device 10 drives the subject vehicle V1 on the target route RT which is preliminarily planned. On the other hand, when the actual vehicle width distance is outside the tolerable vehicle width distance range, the control device 10 newly plans the target route RT on the basis of the current position of the avoidance object and drives the subject vehicle V 1on the newly planned target route RT. Also when the target route RT is newly planned, the target route RT is calculated within the lane in which the subject vehicle V1 travels.

FIG. 8(A) is a view illustrating an example of the tolerable vehicle width distance range and actual vehicle width distance illustrated in FIG. 4. FIG. 8(B) is a view illustrating a lateral position at which the subject vehicle travels in the scene illustrated in FIG. 8(A). In the example illustrated in FIG. 8(A), the actual vehicle width distance transitions within the tolerable vehicle width distance range. Therefore, in the example illustrated in FIG. 8(A), the subject vehicle V1 is to travel, as illustrated in FIG. 8(B), at the lateral position corresponding to the target route RT which is preliminarily planned. As a result, even when the avoidance object sways from right to left, the subject vehicle V1 can travel without swaying.

Finally, the presentation function of the control device 10 according to one or more embodiments of the present invention is described. The control device 10 calculates information in accordance with the object information, information in accordance with the location of the object area R, information in accordance with the location of the target route, and information in accordance with the command information for causing the subject vehicle to travel on the target route and sends the calculated information to the output device 110, which then outputs it to the external in the above-described form.

A travel control process according to one or more embodiments of the present invention will then be described with reference to the flowcharts of FIGS. 9 and 10. The contents of the process in each step are as described above and the flow of the process is mainly described below.

First, the procedure of the travel control as a whole is described with reference to FIG. 9. As described above, in one or more embodiments of the present invention, the travel control process illustrated in FIG. 9 is repeatedly executed at regular intervals.

In step S101, the control device 10 acquires subject vehicle information that includes at least the position of the subject vehicle V1. The subject vehicle information may further include the vehicle speed and/or acceleration of the subject vehicle V1. In step S102, the control device 10 acquires object information that includes the position of an avoidance object which the subject vehicle V1 should avoid. The object information may further include the speed and/or acceleration of the avoidance object.

In step S103, the control device 10 acquires the detection result of an avoidance object from the detection device 50. The detection result of an avoidance object includes information on the position of the avoidance object. In step S104, the control device 10 sets an object area R in accordance with the position of the avoidance object.

In step S105, the control device 10 calculates a target route RT that passes the side of the object area R. The target route RT includes one or more target coordinates at which the subject vehicle V1 is to travel. Each target coordinate includes a target lateral position (target X-coordinate) and a target longitudinal position (target Y-coordinate). The target route RT is obtained by connecting the calculated one or more target coordinates and the current position of the subject vehicle V1. A method of calculating the target coordinate or coordinates of step S105 is described later.

In step S106, the control device 10 acquires the target lateral position or positions of the target coordinate or coordinates calculated in step S105. In step S107, the control device 10 compares the current lateral position of the subject vehicle V1 with the target lateral position or positions acquired in step S106 and calculates a feedback gain for the lateral position on the basis of the comparison result.

In step S108, the control device 10 calculates a target control value on the basis of the actual lateral position of the subject vehicle V1, the target lateral position corresponding to the current position, and the feedback gain of step S107. The target control value relates to a turning angle, turning angular velocity and other necessary parameters of the subject vehicle V1 for moving the subject vehicle V1 onto the target lateral position. Then, in step S112, the control device 10 outputs the calculated target control value to the onboard apparatus 200. This allows the subject vehicle V1 to travel on the target route RT which is defined by the target lateral position. When a plurality of target coordinates is calculated in step S105, the process of steps S106 to S112 are repeated every time the target lateral position is acquired, and the target control value for each target lateral position acquired is output to the onboard apparatus 200.

In step S109, the control device 10 acquires the target longitudinal position or positions of the one or more target coordinates calculated in step S105. In step S110, the control device 10 compares the current longitudinal position with the target longitudinal position corresponding to the current longitudinal position, compares the vehicle speed at the current position of the subject vehicle V1 with the vehicle speed at the target longitudinal position, compares the acceleration at the current position of the subject vehicle V1 with the acceleration at the target longitudinal position, and calculates a feedback gain for the longitudinal position on the basis of the comparison result. In step S111, the control device 10 calculates a target control value for the longitudinal position on the basis of the vehicle speed and acceleration corresponding to the target longitudinal position and the feedback gain for the longitudinal position calculated in step S110. As in the previously-described steps S106 to S108 and S112, the process of steps S109 to S112 are repeated every time the target longitudinal position is acquired and the target control value for each target longitudinal position acquired is output to the onboard apparatus 200.

Here, the target control value for the longitudinal direction refers to a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed corresponding to the target longitudinal position. For example, in an engine car, the control device 10 calculates a target amount of intake air (target opening degree of the throttle valve) and a target amount of fuel injection on the basis of calculated values of the current and target acceleration, deceleration and vehicle speed and sends them to the driving device 80. Alternatively, the control device 10 may calculate the acceleration, deceleration and vehicle speed and send them to the vehicle controller 70, which may calculate a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and a control value for the braking operation to achieve these acceleration, deceleration and vehicle speed.

The routine then proceeds to step S112 in which the control device 10 outputs the target control value for the longitudinal direction calculated in step S111 to the onboard apparatus 200. The vehicle controller 70 executes the turning control and drive control to drive the subject vehicle on the target route RT which is defined by the target lateral position and target longitudinal position.

In step S113, the control device 10 controls the output device 110 to present information. The information presented by the output device 110 may be the location/speed of the object area calculated in step S104, the shape of target route calculated in step S105, or the target control value output to the onboard apparatus 200 in step S112.

In step S114, the control device 10 determines whether or not the driver intervenes in the operation, such as the driver performs the steering operation. When the operation by the driver is not detected, the routine returns to step S101, and the setting of a new object area, calculation of target route, and travel control are repeated. On the other hand, when the operation by the driver is detected, the routine proceeds to step S115, in which the travel control is suspended. Step S115 is followed by step S116, in which presentation of information is made that the travel control is suspended.

Referring now to the flowchart of FIG. 10, a target coordinate calculation process of step S105 is illustrated. This process is described below.

First, in step S201, the control device 10 calculates target longitudinal positions by the target route planning function. For example, the control device 10 sets the target longitudinal positions at regular intervals ahead the subject vehicle V1 in its travel direction.

In step S202, the control device 10 determines whether or not an avoidance object is detected, on the basis of the detection result of the avoidance object acquired in step S103. When an avoidance object is detected, the routine proceeds to step S203, while an avoidance object is not detected, the routine proceeds to step S215.

In step S215, a determination has been made that an avoidance object is not detected, and therefore the control device 10 calculates each target lateral position corresponding to each target longitudinal position calculated in step S201 such that the subject vehicle V1 travels straight ahead at certain lateral positions (e.g. center positions of the travel lane for the subject vehicle V1). Then, in step S216, the control device 10 stores a target route RT in the RAM 13 of the control device 10. The target route RT comprises the target longitudinal positions calculated in step S201 and the target lateral positions calculated in step S215.

On the other hand, when a determination is made in step S202 that an avoidance object is detected, the routine proceeds step S203. In step S203, the control device 10 determines whether or not within a process applicable period. Here, the process applicable period refers to a period in which the travel control is performed using the tolerable vehicle width distance range. For example, the process applicable period can be a period from when the subject vehicle V1 starts turning to pass by the side of an avoidance object to when the subject vehicle V1 returns to a certain lateral position (e.g. center position of the travel lane) and starts traveling straight ahead after overtaking the avoidance object. Alternatively, the process applicable period may be a period from when the subject vehicle V1 starts turning to pass by the side of an avoidance object until a fixed time passes. When it is determined to be within the process applicable period, the routine proceeds to step S204, while when it is determined not to be within the process applicable period, the routine proceeds to step S213.

In step S213, it has been determined not to be within the process applicable period and therefore the control device 10 calculates each target lateral position in association with each target longitudinal position calculated in step S201 such that the subject vehicle V1 passes by the side of the object area R set in step S104. Then, in step S214, the control device 10 stores a target route RT in the RAM 13 of the control device 10. The target route RT comprises the target longitudinal positions calculated in step S201 and the target lateral positions calculated in step S213.

On the other hand, when it is determined to be within the process applicable period in step S203, the routine proceeds to step S204. In step S204, the control device 10 determines whether or not the tolerable vehicle width distance range has already been set. For example, when the process of step S204 is performed for the first time after the travel control process of FIG. 9 is started, or when the setting of the tolerable vehicle width distance range is canceled in step S212 which is described later, it is determined that the tolerable vehicle width distance range is not set. When it is determined that the tolerable vehicle width distance range is not set, the routine proceeds to step S205, while when it is determined that the tolerable vehicle width distance range has already been set, the routine proceeds to step S207.

In step S205, the control device 10 calculates a target vehicle width distance on the basis of the target route RT which is preliminarily planned. Specifically, the control device 10 acquires the target route RT which is stored in the RAM 13. Then, the control device 10 calculates each distance $W_t$ from the subject vehicle V1 to the avoidance object along the vehicle width direction as a target vehicle width distance when the subject vehicle V1 travels on the target route RT as illustrated in FIG. 3. Then, in step S206, the control device 10 uses the target vehicle width distance calculated in step S205 as the basis to set the tolerable vehicle width distance range, as illustrated in FIG. 4 to FIG. 6.

As described above, when setting a tolerable vehicle width distance range, the control device 10 appropriately varies the width of the tolerable vehicle width distance range on the basis of the vehicle speed, road width, road type, and attribute of the lane in which the subject vehicle V1 travels. For example, the control device 10 determine whether or not the vehicle speed of the subject vehicle V1 is a predetermined speed or higher. When the vehicle speed of the subject vehicle V1 is the predetermined speed or higher, the tolerable vehicle width distance range is set to be wide, while when the vehicle speed of the subject vehicle V1 is lower than the predetermined speed, then, the control device 10 determines whether or not the width of the road on which the subject vehicle V1 travels is a predetermined value or smaller. When the width of the road on which the subject vehicle V1 travels is a predetermined value or smaller, the width of the tolerable vehicle width distance range is increased, while when the width of the road on which the subject vehicle V1 travels is larger than the predetermined value, then, the type of the road on which the subject vehicle V1 travels is determined. When the type of the road on which the subject vehicle V1 travels is a highway, the width of the tolerable vehicle width distance range is increased, while when the type of the road on which the subject vehicle V1 travels is a general road, then, the control device 10 determines whether or not the lane in which the subject vehicle V1 travels is an overtaking lane. When the lane in which the subject vehicle V1 travels is an overtaking lane, the width of the tolerable vehicle width distance range is increased, while when the lane in which the subject vehicle V1 travels is not an overtaking lane, the width of the tolerable vehicle width distance range can be maintained without being varied.

The above-described example exemplifies a configuration in which a determination is made for the vehicle speed, width of the road, type of the road, and travel lane in this order to set the width of the tolerable vehicle width distance range, but the present embodiment is not limited to this configuration and another configuration may be employed in which, for example, the vehicle speed, width of the road, type of the road, and travel lane are comprehensively taken into account to set the width of the tolerable vehicle width distance range.

In step S207, the control device 10 calculates an actual distance between the subject vehicle V1 and the avoidance object in the vehicle width direction (actual vehicle width distance). Then, in step S208, the control device 10 determines whether or not the actual vehicle width distance calculated in step S207 is outside the tolerable vehicle width distance range set in step S206. When the actual vehicle width distance is within the tolerable vehicle width distance range, the routine proceeds to step S209, while when the actual vehicle width distance is outside the tolerable vehicle width distance range, the routine proceeds to step S210.

In step S209, it has been determined that the actual vehicle width distance is within the tolerable vehicle width distance range, and therefore the target lateral positions are calculated on the basis of the target route RT, which is stored in the RAM 13, without setting a new target route RT. That is, each target lateral position is calculated in association with each target longitudinal position set in step S201 such that the subject vehicle V1 travels on the target route RT which is preliminarily determined.

On the other hand, in step S210, it has been determined that the actual vehicle width distance is outside the tolerable vehicle width distance range, and therefore the target lateral positions are newly calculated on the basis of the current position of the avoidance object. That is, each target lateral position in association with each target longitudinal position set in step S201 is calculated such that the subject vehicle V1 passes by the side of the object area R which is set on the basis of the current position of the avoidance object. Then, in step S211, the control device 10 stores the target route RT, which comprises the target longitudinal positions calculated in step S201 and the target lateral positions calculated in step S210, in the RAM 13 of the control device 10. In step S212, the control device 10 cancels the setting of the tolerable vehicle width distance range which is set in step S206. Through this operation, in the next travel control process, the tolerable vehicle width distance range is to be set on the basis of the target route RT which is planned in the travel control process of this time.

The travel control device 100 according to one or more embodiments of the present invention is configured and operates as the above and therefore has the following effects.

According to one or more embodiments of the present invention, when the actual distance between the subject vehicle V1 and the avoidance object along the vehicle width direction (actual vehicle width distance) is within the tolerable vehicle width distance range, the subject vehicle V1 is driven on the target route RT which is preliminarily planned. Through this operation, even in a scene in which the avoidance object sways from right to left and the actual vehicle width distance varies repeatedly, when the actual vehicle width distance is within the tolerable vehicle width distance range, the subject vehicle V1 travels on the target route RT which is preliminarily set, and it is therefore possible to effectively prevent the sway of the subject vehicle V1 due to the sway of the avoidance object. In particular, in one or more embodiments of the present invention, the avoidance object may be a moving object such as a traveling vehicle. When the avoidance object is a moving object such as a traveling vehicle, it is supposed that the traveling vehicle as the avoidance object travels while swaying from right to left in the vehicle width direction in accordance with the travel condition of the traveling vehicle, skill of the drive of the traveling vehicle, and vehicle performance of the traveling vehicle. Therefore, when the avoidance object is a moving object such as a traveling vehicle, a particularly significant effect can be obtained.

Moreover, according to one or more embodiments of the present invention, when the actual vehicle width distance is outside the tolerable vehicle width distance range, a new target route RT is planned on the basis of the current position of the avoidance object. Therefore, even if the avoidance object comes close to the subject vehicle V1, it is possible to ensure an appropriate distance between the avoidance object and the subject vehicle V1 along the vehicle width direction.

Furthermore, according to the travel control device 100 in one or more embodiments of the present invention, information regarding the travel control for passing by the side of the object area R is output to external, and the passengers in the subject vehicle and/or other vehicles can thereby be preliminarily informed of the behavior of the subject vehicle. This allows the passengers of the subject vehicle and/or other vehicles to respond to the behavior of the subject vehicle.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

That is, in the present description, one or more embodiments of the travel control device according to the present invention are described by exemplifying the travel control device 100 which, together with the onboard apparatus 200, constitutes the travel control system 1, but the present invention is not limited to this.

The above-described embodiments exemplify a configuration in which the tolerable vehicle width distance range is set thereby to mitigate the sway of the subject vehicle V1 due to the sway of the other vehicle V2, but the present embodiment is not limited to this configuration. For example, another configuration may be employed in which the threshold for newly planning the target route RT is provided with hysteresis thereby to mitigate the sway of the subject vehicle V1 due to the sway of the other vehicle V2. As illustrated in FIG. 11, for example, in the case in which the subject vehicle V1 and the avoidance object come close to each other, when the distance between the subject vehicle V1 and the avoidance object along the vehicle width direction becomes equal to or smaller than a first distance W1, the target route RT is newly set such that the subject vehicle V1 comes away from the avoidance object. On the other hand, in the case in which the subject vehicle V1 and the avoidance object come away from each other, when the distance between the subject vehicle V1 and the avoidance object along the vehicle width direction becomes equal to or larger than a second distance W2 that is larger than the first distance W1, the target route RT can be newly planned such that the subject vehicle V1 comes close to the avoidance object. Thus, whether or not to newly planned the target route RT is determined using the first and second distances W1 and W2 as different thresholds thereby to effectively prevent the sway of the subject vehicle V1 due to the sway of the avoidance object. Note that FIG. 11 is a view for describing a travel control process using hysteresis.

The above-described embodiments exemplify a configuration to calculate the distance $W_t$ from the subject vehicle V1 to the avoidance object along the vehicle width direction as a target vehicle width distance on the assumption that the subject vehicle V1 is driven on the target route RT, but the present invention is not limited to this configuration. For example, another configuration can be employed to calculate, as the target vehicle width distance, a distance along the vehicle width direction from the subject vehicle V1 to the lane at the side of the avoidance object, or a distance along the vehicle width direction from the subject vehicle V1 to the end line of the object area R at the side of the subject vehicle V1, or a distance along the vehicle width direction from the subject vehicle V1 to the road shoulder at the side of the avoidance object, so that the subject vehicle V1 is driven on the target route RT. In this case, in conformity with the target vehicle width distance, the actual vehicle width distance is also to be an actual distance along the vehicle width direction from the subject vehicle V1 to the lane at the side of the avoidance object, or an actual distance along the vehicle width direction from the subject vehicle V1 to the end line of the object area R at the side of the subject vehicle V1, or an actual distance along the vehicle width direction from the subject vehicle V1 to the road shoulder at the side of the avoidance object.

In the above-described embodiments, the object information acquisition function corresponds to the object information acquisition unit of the present invention, the target route planning function corresponds to the planning unit and setting unit of the present invention, the control function corresponds to the control unit of the present invention, and the presentation function corresponds to the output unit of the present invention.

DESCRIPTION OF REFERENCE NUMERALS

1 Travel control system
100 Travel control device
10 Control device
20 Communication device
30 Output device
31 Display
32 Speaker
200 Onboard apparatus
40 Communication device
50 Detection device
60 Sensor
70 Vehicle controller
80 Driving device
90 Steering device
110 Output device
120 Navigation device

The invention claimed is:

1. A travel control device equipped in a subject vehicle comprising:

an object information acquisition unit configured to acquire object information including a position of an avoidance object that exists around a subject vehicle;

a planning unit configured to plan a target route passing a side of the avoidance object on a basis of a position of the subject vehicle and the position of the avoidance object;

a control unit configured to output command information for driving the subject vehicle on the target route; and a setting unit configured to:

calculate a target vehicle width distance from the subject vehicle to the avoidance object along a vehicle width direction when driving the subject vehicle on the target route; and set a tolerable vehicle width distance range from a first vehicle width distance which is shorter than the target vehicle width distance to a second vehicle width distance which is longer than the target vehicle width distance, wherein the control unit calculates an actual vehicle width distance from the subject vehicle to the position of the avoidance object along the vehicle width direction and determines whether or not the actual vehicle width distance is within the tolerable vehicle width distance range, when the actual vehicle width distance from the subject vehicle to the position of the avoidance object along the vehicle width direction is within the tolerable vehicle width distance range, the control unit drives the subject vehicle on a basis of the target route, and when the subject vehicle and the avoidance object come close to each other and the actual vehicle width distance from the subject vehicle to the position of the avoidance object along the vehicle width direction is outside the tolerable vehicle width distance range, the planning unit sets a new target route on the basis of the position of the avoidance object.

2. The travel control device according to claim 1, wherein, when the actual vehicle width distance from the subject vehicle to the position of the avoidance object along the vehicle width direction is outside the tolerable vehicle width distance range, the control unit drives the subject vehicle on a basis of the new target route.

3. The travel control device according to claim 1, wherein, when a vehicle speed of the subject vehicle is a predetermined speed or higher, the setting unit sets the tolerable vehicle width distance range to have a wider width than a width of the tolerable vehicle width distance range which is set when the vehicle speed of the subject vehicle is lower than the predetermined speed.

4. The travel control device according to claim 1, wherein, when a width of a road on which the subject vehicle travels is a predetermined value or smaller, the setting unit sets the tolerable vehicle width distance range to have a wider width than a width of the tolerable vehicle width distance range which is set when the width of the road is larger than the predetermined value.

5. The travel control device according to claim 1, wherein the setting unit sets a width of the tolerable vehicle width distance range in accordance with a type of a road on which the subject vehicle travels.

6. The travel control device according to claim 1, wherein, when a road on which the subject vehicle travels has a plurality of lanes, the setting unit sets a width of the tolerable vehicle width distance range in accordance with an attribute of a lane in which the subject vehicle travels.

7. The travel control device according to claim 1, wherein, when a first distance range is a part of the tolerable vehicle width distance range outside a target vehicle width distance and a second distance range is a part of the tolerable vehicle width distance range inside the target vehicle width distance, the tolerable vehicle width distance range is set such that a width of the second distance range is narrower than a width of the first distance range.

8. The travel control device according to claim 1, wherein, when the subject vehicle passes by the side of the avoidance object, the setting unit sets a width of the tolerable vehicle width distance range such that the width of the tolerable vehicle width distance range corresponding to a section before a passing start position and/or a section after a passing completion position is narrower than the width of the tolerable vehicle width distance range corresponding to a section between the passing start position and the passing completion position,
wherein the passing start position is a position at which a distance from a front end of the subject vehicle to the avoidance object becomes less than a predetermined distance and the passing completion position is a position at which a distance between a rear end of the subject vehicle and the avoidance object decreases and then increases.

9. The travel control device according to claim 1, further comprising
an output unit configured to output, to external, one or more information items among information in accordance with the object information, information in accordance with a location of an object area that is set on a basis of the avoidance object, information in accordance with a location of the target route, and information in accordance with the command information for driving the subject vehicle on the target route.

10. A travel control method executed by a computer equipped in a subject vehicle, the computer outputting command information for controlling travel of a subject vehicle, the travel control method comprising:
acquiring object information including a position of an avoidance object that exists around the subject vehicle;
planning a target route passing a side of the avoidance object on a basis of the position of the avoidance object; and
outputting command information for driving the subject vehicle on the target route, the outputting command information comprising:
calculating a target vehicle width distance from the subject vehicle to the avoidance object along a vehicle width direction when driving the subject vehicle on the target route;
setting a tolerable vehicle width distance range from a first vehicle width distance which is shorter than the target vehicle width distance to a second vehicle width distance which is longer than the target vehicle width distance;
calculating an actual vehicle width distance from the subject vehicle to the position of the avoidance object along the vehicle width direction;
determining whether or not the actual vehicle width distance is within the tolerable vehicle width distance range; and
driving the subject vehicle on a basis of the target route when the actual vehicle width distance from the subject vehicle to the position of the avoidance object along the vehicle width direction is within the tolerable vehicle width distance range, and
wherein the planning the target route comprises:
planning a new target route on the basis of the position of the avoidance object when the subject vehicle and the avoidance object come close to each other and the actual vehicle width distance from the subject vehicle to the position of the avoidance object along the vehicle width direction is not within the tolerable vehicle width distance range.

* * * * *